United States Patent Office 2,960,648
Patented Nov. 15, 1960

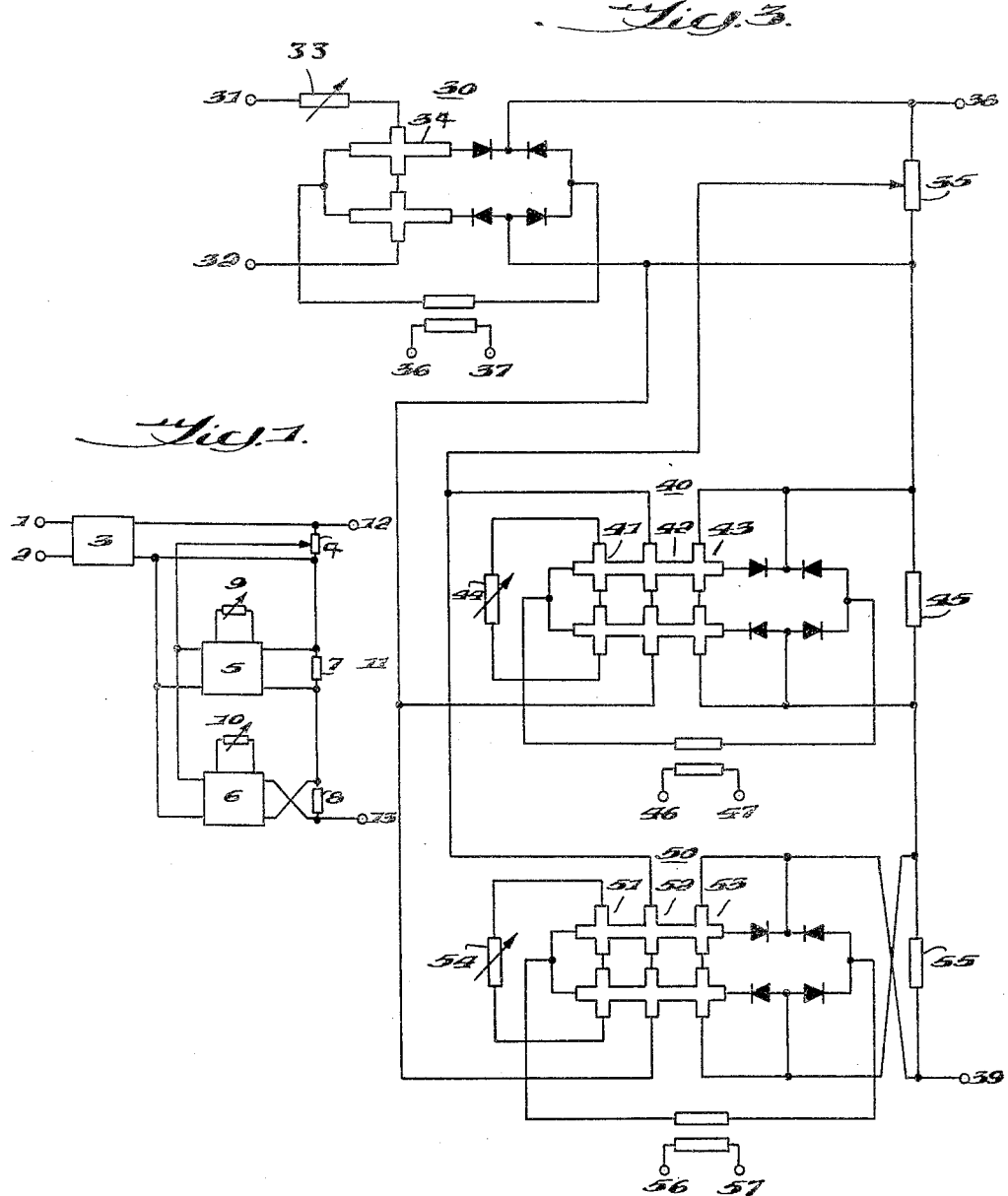

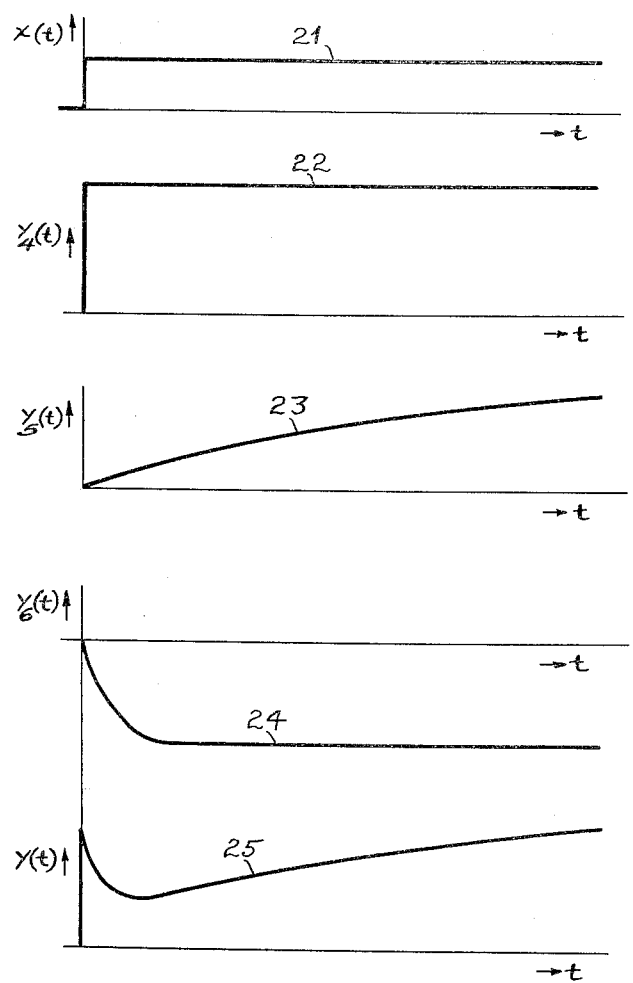

2,960,648
REGULATING SYSTEM

Max Syrbe, Mannheim-Wallstadt, Germany, assignor to Brown, Boveri & Cie., Aktiengesellschaft, Mannheim, Germany, a joint stock company of Germany Filed Apr. 3, 1957, Ser. No. 650,526

Claims priority, application Germany Apr. 28, 1956

6 Claims. (Cl. 323—89)

This invention relates to a controller, the particular feature of which is that its output comprises three components which are respectively directly proportional to the input, proportional to the integral with respect to time of the input, and proportional to the rate of change of the input. To illustrate the manner in which the components are combined to provide the output and, furthermore, to demonstrate that the invention does in fact produce components which fulfil the desired conditions, and which can be combined in practice to give an output of the desired nature, it is necessary to explain the mathematical theory on which the invention is founded.

It is a common knowledge that a feedback control system comprises the controlled object and the controller. For the process of control, the governing factors are the behavior with respect to time (subsequently referred to as the response) both of the controlled circuit and of the controller.

By the response is meant the relationship with respect to time between a change in the input and the resultant change in the output of the elements of the control system.

The response can be determined by investigating the frequency response or by recording the transient response.

During investigation of the frequency response, the input is varied sinusoidally with respect to time and the amplitude and phase angle of the resultant output measured. This measurement is carried out for a number of different values of the input frequency.

To record the transient response, the input is abruptly varied, preferably according to a unit step function, also known as unit surge, and the output plotted with respect to time.

A control problem cannot possibly be satisfactorily solved unless the response of the controller is matched to that of the controlled object.

As regards the response of continuous-action controllers, i.e. those whose output, the manipulated variable, can assume any value within the control range, it is usual to distinguish between three different basic types, namely: controllers with a proportional action (known as P-controllers in short), controllers with an integral action (I-controllers), and the controllers with a rate action, i.e. differential response (D-controllers).

With the P controller in the steady state every input $x(t)$ is related to the output $y(t)$ by the proportionality factor $k$. Thus the transient function of the P controller is given by the simple equation $$y(t) = k.x(t) \quad (1)$$

while the frequency response is given by $$F(p) = k \quad (2)$$

in which $p$ denotes the imaginary angular frequency, i.e.

$$p = i\omega$$

With the I controller in the steady state, every input $x(t)$ is related to a definite rate of change of the output $y(t)$. This relationship is likewise proportional to the proportionality factor $T_N$. Therefore $x = T_N.y(t)$. The output itself is then proportional to the integral of the input; hence the transient function of the I conroller is given by $$y(t) = 1/T_N \int_0^t x(\gamma) d\gamma \quad (3)$$

while the frequency response is given by $$F(p) = 1/p . 1/T_N \quad (4)$$

The two types of controller described above become D controllers when an additional change in the output $y(t)$ is produced which is proportional to the rate of change of the input, that is to say $dx(t)/dt$; the proportionality factor in this case being $T_V$.

The part of the transient function which expresses the D response may consequently be written $$y(t) = T_V.dx(t)/dt \quad (5)$$

with the frequency response $$F(p) = p.T_V \quad (6)$$

These three types of controller may be combined in a number of ways. The most important combination is what is referred to here as the PID controller. It provides an output $y(t)$, the first part of which is proportional to the input $x(t)$. The second part is proportional to the integral with respect to time of the input, and the third part is proportional to the rate of change of the input.

The transient function of the PID controller is therefore $$y(t) = k.x(t) + 1/T_N \int_0^t x(\gamma) d\gamma + T_V.dx(t) dt \quad (7)$$

and the frequency response $$F(p) = k + 1/T_N . 1/p + p.T_V \quad (8)$$

If the controller contains an amplifier with an amplification factor V, the right-hand side of the Equations 7 and 8 must be multiplied by V. The controller is characterized by V and the coefficients $k$, $T_N$ and $T_V$. Their magnitude and that of the amplification factor are governed by the nature of the particular task, and differ from one case to another.

It is well-known that almost all control problems encountered in the various spheres of engineering can be solved by means of PID controllers. In order to adapt them to the changing demands of practical circumstances, the controller coefficients and the amplification factor must be adjustable. An accepted method is to combine the controller with a four-pole network, which produces the relationships between the input and the output, given by the Equations 7 and 8. The four-pole network must be adjustable, but it possesses the drawback that one controller coefficient cannot be varied without affecting the others. The task of adjustment thus becomes laborious and takes a long time.

It is furthermore known that a PID controller may be constructed in such a manner that, analogous to Equation 7, separate channels may be provided for each of the three components of this equation, that is, the P component, the I component, and the D component. When the quantity $x(t)$ is applied to their common input, their individual outputs may be added, their sum forming the output $y(t)$ of the controller.

With these PID controllers, and in particular those employing electrical aids, the problem is to find suitable circuit layouts for the three channels, which not only preserve the analogy to Equation 7 but which also permit addition of the output values without affecting the input. A further problem concerns the difficulty of keeping the operating ranges of the three channels coincident over long periods.

A particularly favorable method of overcoming these difficulties and of eliminating the aforementioned drawbacks is afforded by the present invention, in that for a controller with PID response, the input variable is fed to an adjustable voltage divider—acting as the P element—and also direct to the mixing circuit on the output side of the whole controller, moreover the P element is connected to the same mixing circuit through two parallel-connected delay elements whose time constants can be set to different values; one of the latter elements being connected with the mixing circuit in the opposite sense to the other two elements.

Continuing the principle of the invention, the two delay elements, whose time constants may be set to different values, are formed by negative-feedback amplifiers, whose input and output are galvanically separated, and which possess suitably adjustable time constants. The most suitable example in this respect is provided by magnetic amplifiers, with which the galvanic separation between input and output is most easily obtained, thus allowing the output terminals to be connected without one amplifier disturbing the other. The PID controller thus formed may be universally employed, permitting the three coefficients to be easily but reliably matched and independently adjusted. Hence, the setting can be calibrated.

In the drawing Fig. 1 shows a circuit layout illustrating a PID controller. Fig. 2 shows a family of curves representing the functions of the device. Fig. 3 shows diagrammatically an example of the application of the PID principle.

The PID controller which serves as an example of this invention employs a circuit layout illustrated schematically in Fig. 1. The input $x(t)$ applied to the terminals 1 and 2 is first linearly amplified in amplifier 3 which has an amplification factor $V_1$. Next it is directed into the channel dealing with the proportional component, which contains a voltage divider 4, with the aid of which the controller coefficient $k$ can be adjusted. Simultaneously the whole of the voltage divider acts as the output impedance of the channel. Connected to its tapping point are the parallel-connected channels 5 and 6. They are equipped with delaying elements whose time constants can be differently adjusted. The I component is produced in channel 5, the D component in channel 6. Both of these are obtained by suitable adjustment of the time constants.

The input $x(t)$, amplified to the value $V_1.x(t)$ in the amplifier 3 with the amplification factor $V_1$, is applied to the voltage divider 4 of the P channel; hence the transfer function of this channel may be written $$y_4(t) = V_1.x(t) \qquad (9)$$

At the point of tapping from the potentiometer 4 the fraction $(1-k)V_1.x(t)$ is tapped off and conducted to the channels 5 and 6. Each of these channels has a magnetic amplifier with full negative feedback, acting as the delaying element. Their amplification factors thus become approximately unity, whereas they would have had the values $V_5$ and $V_6$ without the negative feedback. The time constants $T_5$ and $T_6$ of these amplifiers can be set by means of the rheostats 9 and 10. To obtain the I- and D-components, $T_5$ is set to a higher value than $T_6$. The outputs from the three channels are then applied to the mixing circuit 11 of the complete controller across the three series resistors 4, 7 and 8.

Now an amplifier without a time constant, having an amplification factor $V$ has the following transfer function:

$$y(t) = V.x(t) \qquad (10)$$

If the amplifier is subject to negative feedback the equation becomes $$y(t) = \frac{V}{1+V}.x(t) \qquad (11)$$

If it receives no negative feedback but has a time constant T, the function is $$y(t) = V(1-e^{-t/T}).x(t) \qquad (12)$$

Therefore with both negative feedback and time constant the function becomes $$y(t) = \frac{V}{1+V}\left[1-e^{-\frac{(1+V)t}{T}}\right].x(t) \qquad (13)$$

At the output resistor 7 of channel 5, which has an amplification factor of $V_5$ and a time constant of $T_5$ due to the amplifier contained in the channel, the output $y_5(t)$ resulting when a unit surge of $x(t)=1$ is applied to the controller input, is therefore $$y_5(t) = (1-k)V_1 \cdot \frac{V_5}{1+V_5}\left[1-e^{-\frac{t(1+V_5)}{T_5}}\right] \qquad (14)$$

Similarly the output $y_6(t)$ at the load resistor 8 of channel 6, the amplification factor and time constant of which are $V_6$ and $T_6$, respectively, is given by $$y_6(t) = (1-k)V_1 \frac{V_6}{1+V_6}\left[1-e^{-\frac{(1-V_6)t}{T_6}}\right] \qquad (15)$$

If the transfer function of the whole controller is now formed by adding the output functions of the various channels, taking into account that channel 6 is directionally opposed to the other two, we obtain, for $x(t)=1$, $$y(t) = y_4(t) + y_5(t) - y_6(t) \qquad (16)$$

or $$y(t) = V_1 + (1-k)V_1 \cdot \frac{V_5}{1+V_5}\left[1-e^{-\frac{(1+V_5)t}{T_5}}\right]$$
$$-(1-k)V_1 \frac{V_6}{1+V_6}\left[1-e^{-\frac{(1+V_6)t}{T_6}}\right] \qquad (17)$$

If the relationships are so arranged that $V_5$ is greater than or equal to 20, $V_6$ is greater than or equal to 20, and $k$ lies between zero and 0.05, that is to say, a 5% error is considered admissible, then when $t$ is equal to or greater than zero, i.e. for positive times $$y(t) = (1-k)V_1\left[\frac{k}{(1-k)} + 1 - e^{-\frac{V_5 t}{T_5}} + e^{-\frac{V_6 t}{T_6}}\right] \qquad (18)$$

From this we may deduce that the frequency response of the whole controller is given by $$F_r(p) = (1-k)V_1\left[\frac{k}{1-k} + \frac{V_5/T_5}{P+V_5/T_5} + \frac{P}{P+V_6/T_6}\right] \qquad (19)$$

For $V_5/T_5 \ll p \ll V_6 V_6$ and for $k \ll 1$, this may be written:

$$F_R(p) = V_1\left[k + \frac{V_5}{T_5 p} + \frac{T_6}{V_6}p\right] \qquad (20)$$

If now in this equation we substitute $$V_1 = V; \quad T_5/V_5 = T_V; \quad k=k; \quad T_6/V_6 = T_N \qquad (21)$$

the agreement with Equation 8 is obvious, thus proving that the controller forming the subject of the invention is, in fact, a PID controller.

In Fig. 2 the input variable $x(t)$ is represented by curve 21; its linear amplification across the whole of resistance 4, that is $y_4(t) = V_1.x(t)$, by curve 22; the transfer functions $y_5(t)$ and $y_6(t)$ of the channels 5 and 6, by the curves 23 and 24, respectively. Finally the combination of the functions $y_4(t)$, $y_5(t)$ and $y_6(t)$, giving $y(t)$, the total output is represented by curve 25. The directional opposition of channel 6 is taken into account by reflecting the curve 24 about the $t$-axis. As will be obvious from the curves, suitable adjustment of the time constants by rheostats 9 and 10 in Fig. 1 enables the I- and D-components to be obtained from channels 5 and 6.

Fig. 3 shows diagrammatically a particularly favorable example of the application of the PID principle according to the invention. Since this is merely an example of the application of the invention, the latter must not be considered as limited to this one case.

The control voltage corresponding to the input variable $x(t)$ is applied to the input terminals of the controller (31 and 32). From there it passes across resistance 33, used to adjust the amplification factor $V_1$, to the control winding of magnetic amplifier 30. The latter corresponds to the amplifier 3 in Fig. 1. The output voltage of amplifier 30 corresponds to the output $y_4(t)$. It is applied to the load resistance 35 which is in the form of a voltage divider. Tapped off it are the parallel-connected control windings 42 and 52 of the magnetic amplifiers 40 and 50, respectively, which correspond to the amplifiers in the channels 5 and 6 in Fig. 1.

The output voltage of amplifier 40 corresponds to the output $y_5(t)$; it is applied to the output resistance 45 and to the negative feedback winding 43 in parallel with that resistance. If these windings have the same number of turns as the control windings 42, the amplification factor of this amplifier to all outward purposes is approximately 1. By means of the variable resistance 44 connected to winding 41, the time constant of amplifier 40 is adjusted in well-known manner. The supply voltage is applied to terminals 46 and 47.

The output voltage of amplifier 50 corresponds to the quantity $y_6(t)$. It is applied to the output resistance 55 in parallel with which are the negative feedback windings 53. These have the same number of turns as the control windings 52, so that the amplification factor of amplifier 50 is likewise almost 1. By means of the variable resistance 54, connected to the windings 51, the time constant of amplifier 50 is similarly adjusted. Terminals 56 and 57 carry the supply voltage.

The three series resistances 35, 45 and 55 correspond to the mixing circuit 11 in Fig. 1. The connection of resistance 55, however, is such that the output voltage of amplifier 50 applied to it, is in opposition to the voltages applied to resistances 35 and 45, and is therefore subtracted from them. Hence, the voltage across the output terminals 38 and 39 of the entire controller corresponds to the function $y(t)$, thus completing the analogy to Equation 16.

I claim:

1. In a controller having a combined voltage output comprising three components which are respectively directly proportional to the voltage input, proportional to the integral with respect to time of the voltage input and proportional to the rate of change of the voltage input with respect to time, the combination comprising an output mixing circuit for combining said three components, said mixing circuit including first, second and third series connected impedances, circuit means connecting said input voltage across said first impedance which constitutes the directly proportional component of the voltage input, a pair of parallel arranged time delaying devices having different and adjustable time delay constants connected across a selected portion of said first impedance, said time delaying devices producing output voltages corresponding respectively to said integral and rate of change components of the voltage input, and circuit means connecting the output voltages of said time delaying devices respectively across said second and third impedances, the voltage output applied to said second impedance being in a direction opposite to the voltage output applied to said third impedance as related to the sum of the voltages obtained across said three series connected impedances.

2. A controller as defined in claim 1 wherein said time delaying devices are constituted by feed-back amplifiers, the input and output sides of said amplifiers being galvanically separated.

3. A controller as defined in claim 2 wherein said feedback amplifiers are of the magnetic type.

4. A controller as defined in claim 2 wherein said feedback amplifiers have a unity amplification factor.

5. A controller as defined in claim 1 and which further includes a linear amplifier interposed in said circuit means connecting said input voltage to said first impedance.

6. A controller as defined in claim 5 wherein said linear amplifier is of the magnetic type.

References Cited in the file of this patent

UNITED STATES PATENTS

| | | |
|---|---|---|
| 2,138,732 | Craig | Nov. 29, 1938 |
| 2,797,340 | Bennett | June 25, 1957 |